(12) United States Patent
Edelmann et al.

(10) Patent No.: US 11,401,972 B2
(45) Date of Patent: Aug. 2, 2022

(54) CAGE FOR A ROLLING-ELEMENT BEARING

(71) Applicant: AKTIEBOLAGET SKF, Gothenburg (SE)

(72) Inventors: Ludwig Edelmann, Sulzthal (DE); Roland Haas, Schweinfurt (DE); Dominic Namyslo, Schweinfurt (DE); Matthias Schuler, Stadtlauringen (DE); Johannes Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/101,117

(22) Filed: Nov. 23, 2020

(65) Prior Publication Data

US 2021/0207657 A1    Jul. 8, 2021

(30) Foreign Application Priority Data

Jan. 8, 2020   (DE) .......................... 102020200152.9

(51) Int. Cl.
*F16C 33/46* (2006.01)

(52) U.S. Cl.
CPC ........ *F16C 33/4676* (2013.01); *F16C 33/467* (2013.01); *F16C 33/4635* (2013.01); *F16C 33/4682* (2013.01)

(58) Field of Classification Search
CPC .. F16C 19/26; F16C 33/3887; F16C 33/4617; F16C 33/4623; F16C 33/4629; F16C 33/4635; F16C 33/467; F16C 33/4676; F16C 33/4682
See application file for complete search history.

(56) References Cited

U.S. PATENT DOCUMENTS

| 4,222,620 | A | * | 9/1980 | Mirring | F16C 33/4676 |
| | | | | | 384/576 |
| 4,425,011 | A | * | 1/1984 | Cunningham | F16C 33/4635 |
| | | | | | 384/571 |
| 2001/0051011 | A1 | * | 12/2001 | Takahashi | F16C 33/4635 |
| | | | | | 384/574 |
| 2016/0265587 | A1 | * | 9/2016 | Kamamoto | F16C 3/02 |

FOREIGN PATENT DOCUMENTS

| DE | 4412850 A1 | * | 10/1995 | .......... F16C 33/4635 |
| DE | 10030268 A1 | | 1/2002 | |
| DE | 102011088720 A1 | | 6/2013 | |
| DE | 102015112387 A1 | * | 2/2016 | .......... F16C 33/4676 |

(Continued)

OTHER PUBLICATIONS

Machine Translation of JP-2010112473-A (Year: 2010).*
Machine Translation of JP-2009097525-A (Year: 2009).*

*Primary Examiner* — Alan B Waits
(74) *Attorney, Agent, or Firm* — J-Tek Law PLLC; Scott T. Wakeman; Mark A. Ussai

(57) ABSTRACT

A rolling-element bearing cage includes a plurality of pockets each configured to receive a rolling element, and retaining elements associated with each of the plurality of pockets, each of the retaining elements being configured to secure the rolling elements against falling out of the pockets in a radially inward direction while permitting the rolling elements to be inserted into the pockets in a radially outward direction.

7 Claims, 5 Drawing Sheets

(56) References Cited

FOREIGN PATENT DOCUMENTS

| FR | 3017171 A1 | * | 8/2015 | ........... F16C 33/4682 |
| JP | 2005321049 A | * | 11/2005 | ........... F16C 33/4676 |
| JP | 2007247819 A | * | 9/2007 | ........... F16C 33/4676 |
| JP | 2009097525 A | * | 5/2009 | ........... F16C 33/4635 |
| JP | 2010112473 A | * | 5/2010 | ............. F16C 19/364 |

* cited by examiner

CAGE FOR A ROLLING-ELEMENT BEARING

CROSS-REFERENCE

This application claims priority to German patent application no. 10 2020 200 152.9 filed on Jan. 8, 2020, the contents of which are fully incorporated herein by reference.

TECHNOLOGICAL FIELD

The disclosure is directed to a cage for a rolling-element bearing having a plurality of retaining elements for securing rolling elements in the cage.

BACKGROUND

The publication DE 100 30 268 A1 discloses a cage for a radial rolling-element bearing, via configured to secure cylindrical rolling elements against falling out radially inward. This is accomplished by bridges that connect two side rings to each other and that are disposed in a cavity radially inside the pitch circle. The cavity is delimited on one side by mutually adjacent rolling elements, and on the other side by an inner raceway of the rolling elements, wherein the mutually opposing end surfaces of the side rings include bridge stubs spaced from one another uniformly in the circumferential direction and separating the rolling elements, which bridge stubs have an axial extension such that a slanting or a skewing of the rolling elements is prevented, wherein the bridge stubs are disposed outward in the radial direction over the bridges and have a spacing to one another in the circumferential direction such that falling out of the rolling elements radially outward is prevented. Overall the cage includes a transport-securing device.

The publication DE 10 2011 088 720 A1 relates to a rolling-element bearing cage including a cage ring as well as a plurality of separating bridges that protrude from the cage ring, and together with the cage ring form pockets for the receiving of rolling elements. The rolling-element bearing cage is characterized by a plurality of retaining brackets formed separately from the cage ring and the separating bridges, wherein the retaining brackets are attached to the ends of the separating bridges facing away from the cage ring and engage behind, in the circumferential direction, one pocket or two pockets adjacent to the respective separating bridge in order to prevent a falling-out of rolling elements to be received in the pockets. The retaining brackets provide a transport-securing function.

SUMMARY

An aspect of the disclosure is to provide a more efficient cage of the above-mentioned type.

The disclosure is directed to a cage for a rolling-element bearing, in particular a tapered roller bearing, including a plurality of pockets, which are each formed for receiving a rolling element.

The disclosed cage includes a plurality of retaining elements that are configured to secure rolling elements inserted into the pockets from falling out of the cage in a radially inward direction, and to allow for insertion of the rolling elements into the pockets from radially inward when filling the cage with the rolling elements. An efficient cage can thereby be provided. In particular, the cage can be filled with rolling element in a cost-effective manner and in particular without a costly tool. In particular it can also be achieved that a component made from the inner ring, the cage, and the rolling elements is easily removable from a complete rolling-element bearing, since the rolling elements do not fall out, which is useful if, for example, the inner ring is to be reground or replaced.

The retaining elements are preferably formed at least partially by radially inward extensions of bridges of the cage. In this way a constructively simple design can be achieved.

At least two of the retaining elements are advantageously plate-shaped, radially inwardly extending extensions of bridges of the cage. A relatively uncomplicated manufacturability can thereby be achieved.

Furthermore, at least two of the retaining elements can each include at least one retaining lug extending in the circumferential direction of the cage. In this way a reliable transport-securing can be achieved.

At least two of the retaining lugs preferably extend into the same pocket of the cage. A particularly reliable transport-securing can thereby be achieved.

The at least two retaining lugs are advantageously disposed on radially inwardly extending projections of bridges of the cage.

In addition, the cage can include at least one retaining lug that extends from an edge of a pocket into the pocket. A compact design of the cage can thereby be achieved. The pocket is preferably rectangular, and the retaining lug extends from a short side of the rectangle. A contact to an end surface of a rolling element can thereby be produced in a simple manner. In a plan view of the pocket, the retaining lug particularly preferably extends in the radial direction of the cage essentially parallel to a long side of the rectangle, whereby the retaining lug can engage in a recess on an end side of the rolling element and can perform a retaining function.

The cage advantageously includes at least two elements extending in the axial direction, starting from an annular part of the cage, which elements, adjacent to an end side of a rolling element that is inserted into a pocket of the cage, are configured to abut against a rolling surface of the rolling element during the transportation of a unit made up of the cage including inserted rolling elements. In a realization of a transport-securing device, a particularly simple installation of the rolling elements into the pockets of the cage can thereby occur.

Furthermore, a unit is proposed that includes rolling elements and a cage as described above, in which the rolling elements are inserted into the pockets. Furthermore, a rolling-element bearing is disclosed, in particular a tapered roller bearing, including the unit.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

Figure 1:
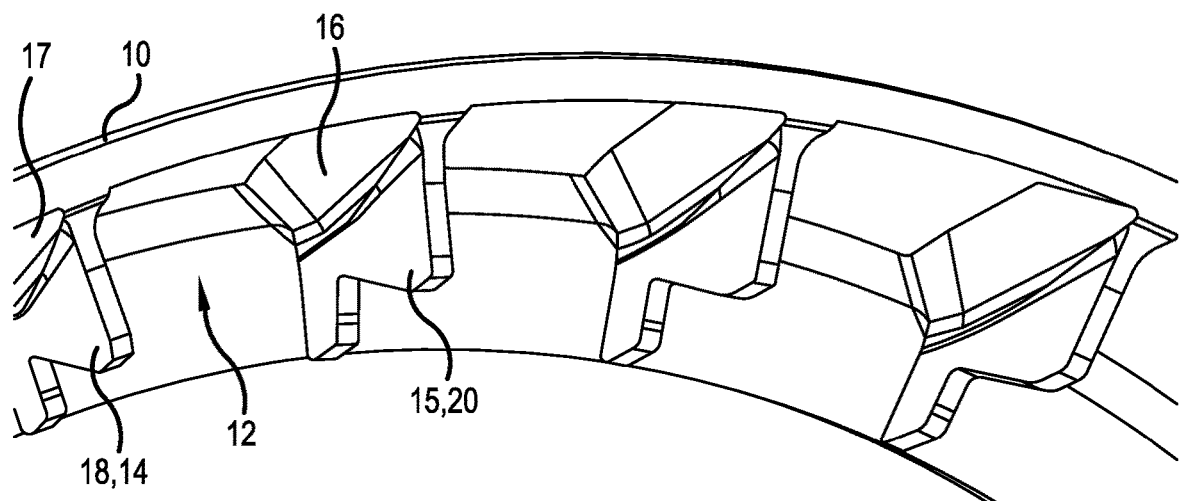
FIG. 1 is a perspective view of a part of a cage according to an embodiment of the invention.
Figure 2:
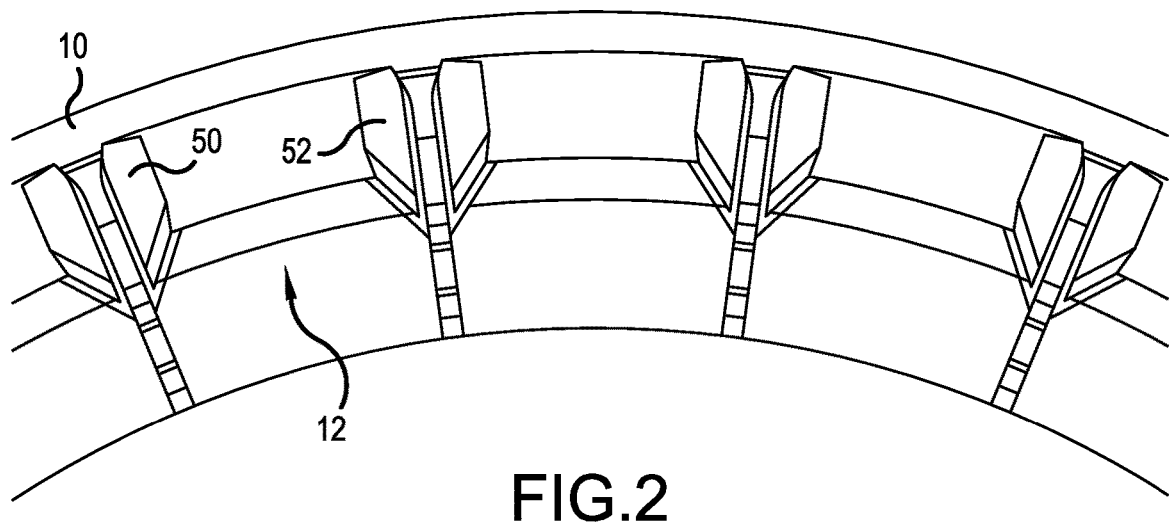
FIG. 2 is a perspective view of the part illustrated in FIG. 1 along an axial direction.
Figure 3:
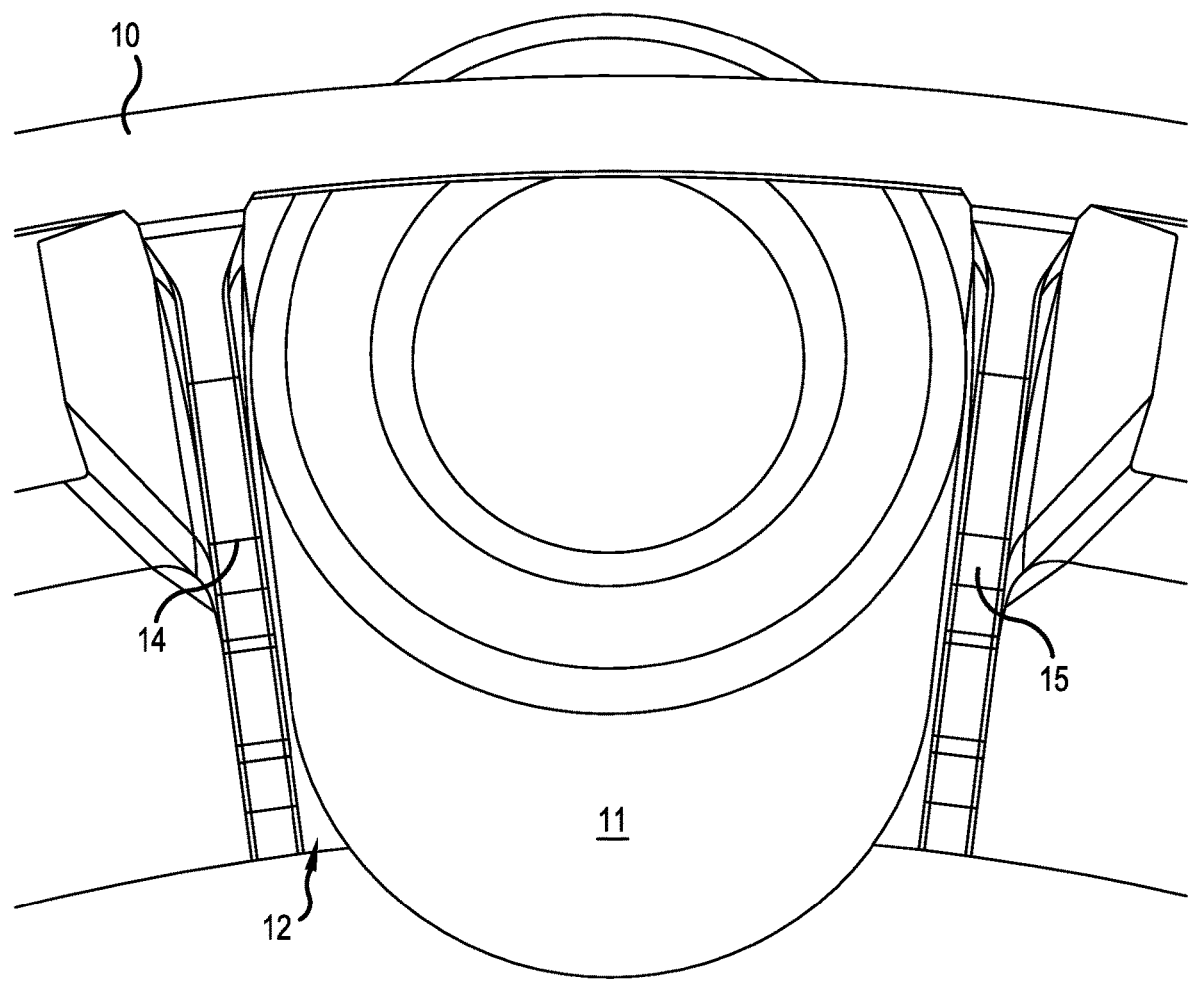
FIG. 3 is a perspective view of a pocket of the cage with a rolling element mounted in the pocket.

FIG. 1 shows a perspective view of a part of a cage 10 according to the disclosure, which is formed as a tapered roller bearing cage. A pocket 12 is configured to receive a rolling element 11, i.e., a tapered roller. The pocket 12 is delimited in the circumferential direction by bridges 16, 17. Inward in the radial direction, the bridge 17 includes a plate-shaped extension 18. The extension 18 forms a retaining element 14 (FIGS. 1 to 3). Inward in the radial direction, the bridge 16 includes a plate-shaped extension 20. The extension 20 forms a retaining element 15. The retaining elements 14, 15 secure a rolling element 11, inserted into the pocket 12, from falling radially inward out of the pocket, wherein in this regard the retaining elements form an interference-fit attaching of the rolling element (FIGS. 1 to 3). In other words, the extensions are formed by extensions of the bridges.

During a filling of the pocket 12 by the rolling element 11, the rolling element 11 is simultaneously pressed from radially inward by its rolling surface against the retaining elements 14, 15 until they elastically deflect in the circumferential direction, so that the rolling element moves into the pocket 12 and the retaining elements 14, 15 subsequently move back into their initial position. The rolling element 11 is also protected from falling radially outward from the pocket 12 by a bevel surface 52 of the bridge 16, which starting from the extension 20, extends obliquely radially outward and toward a center of the pocket 12. A bridge of the cage, which bridge delimits the pocket 12 on a side opposite the bridge 16, includes a bevel surface 50 that is configured mirror-inverted with respect to the bevel surface 52.

If in addition to the rolling element 11 the further rolling elements are inserted into the cage, the cage together with all rolling elements forms a unit that can be transported without the rolling elements falling out and getting lost. The rolling elements are thus captively retained in the pockets. The unit is transported to an assembly line where it is assembled with an inner ring and an outer ring into a rolling-element bearing. The rolling-element bearing is a tapered roller bearing. The cage can be formed from a plastic.

Alternative exemplary embodiments are depicted in FIGS. 4 to 8. Essentially identical components, features, and functions are generally numbered with the same reference numbers. However, to differentiate the exemplary embodiments the letters "a," "b," etc. are added to the reference numbers of the exemplary embodiments in FIGS. 4-8. The following description is essentially limited to the differences relative to the exemplary embodiment in FIG. 1 to FIG. 3, wherein with respect to components, features, and functions remaining the same, reference can be made to the description of the exemplary embodiment in FIG. 1 to FIG. 3.

Figure 4:
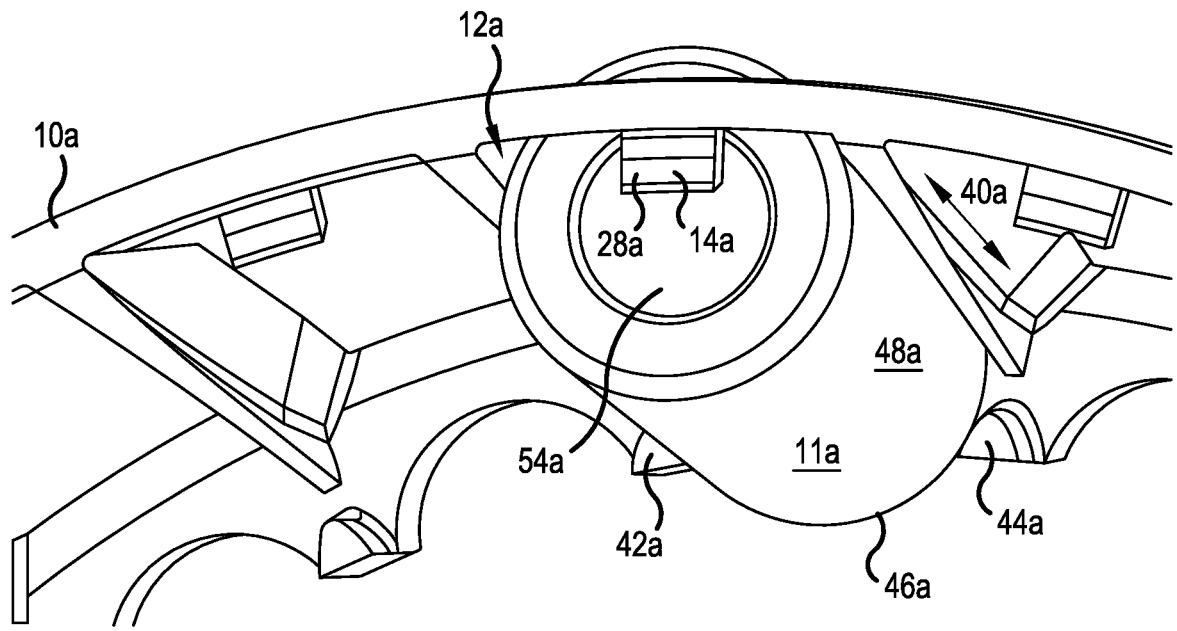
FIG. 4 is a perspective view of another cage that includes a pocket, which pocket contains a rolling element.
Figure 5:
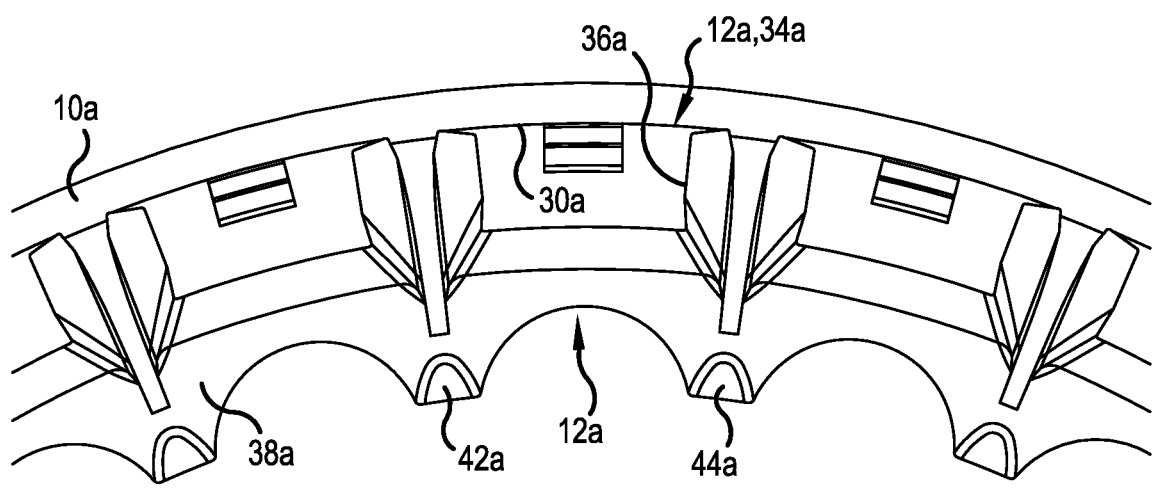
FIG. 5 is a perspective view of a part of the cage according to FIG. 4 along an axial direction.

FIG. 4 shows a perspective view of a further cage 10a including a pocket 12a according to the present disclosure, which pocket 12a contains a rolling element 11a. The cage includes a retaining lug 28a that is directly adjacent to an edge 30a (FIGS. 4 and 5) of the pocket 12a, and starting therefrom extends into the pocket 12a. In a plan view of the pocket from radially outward the pocket has the shape of a rectangle 34a. Starting from a short side 32a of this rectangle, as already mentioned, the retaining lug 28a extends into the pocket, and, specifically, extends essentially parallel to a long side 36a of the pocket. Furthermore, the cage includes an annular part 38a, starting from which two lugs 42a, 44a extend in axial direction 40a toward an axial end of the cage that opposes the annular part 38a. If the rolling elements 11a and the further rolling elements are inserted into the pocket 12a and the further pockets of the cage, then the cage together with the rolling elements forms a unit in which the rolling elements 11a are captively disposed. If a radially outer side of the pocket 12a is oriented upward, then a rolling surface 48 of the rolling element 11a abuts against the lugs 42a, 44a, and the retaining lug 28 engages in an end-side recess of the rolling element 11a and abuts against the edge of the recess, so that the lugs 42a, 44a and the retaining lug 28a protect the rolling element 11a in an interference-fit manner from falling out from the pocket 12a. The elements and the retaining lug thus also attach the rolling element 11a in the pocket 12a in an interference-fit manner. With respect to a radial direction outward the rolling element 11a is held in the pocket 12a in an interference-fit manner by the bridge shape.

Figure 6:
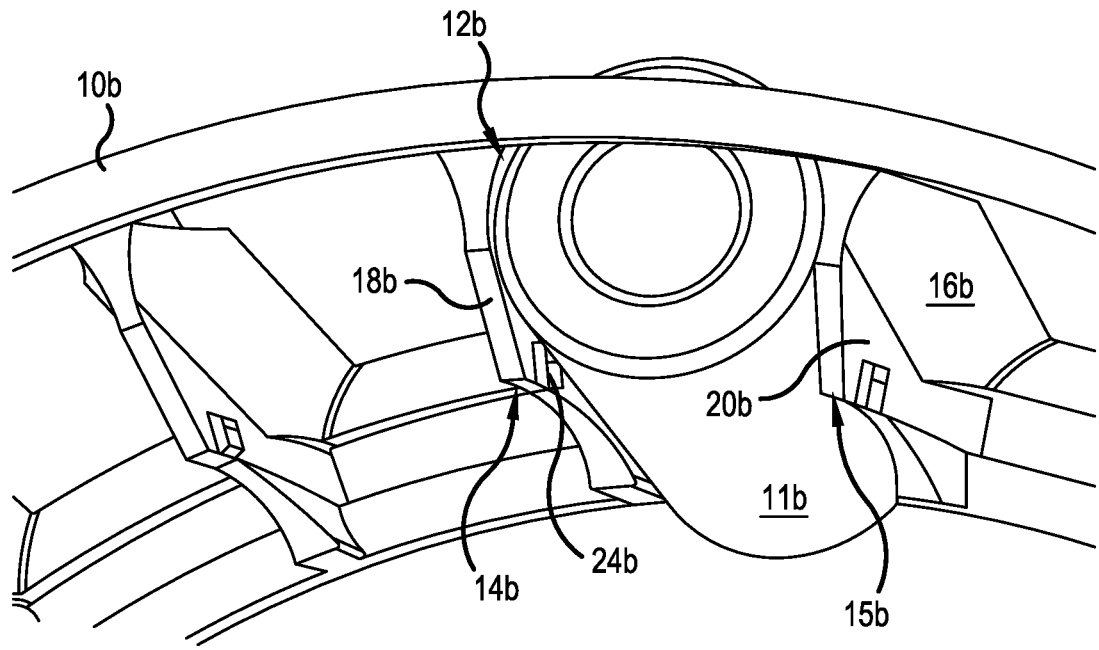
FIG. 6 is a perspective view of another cage that includes a pocket, which pocket contains a rolling element.
Figure 7:
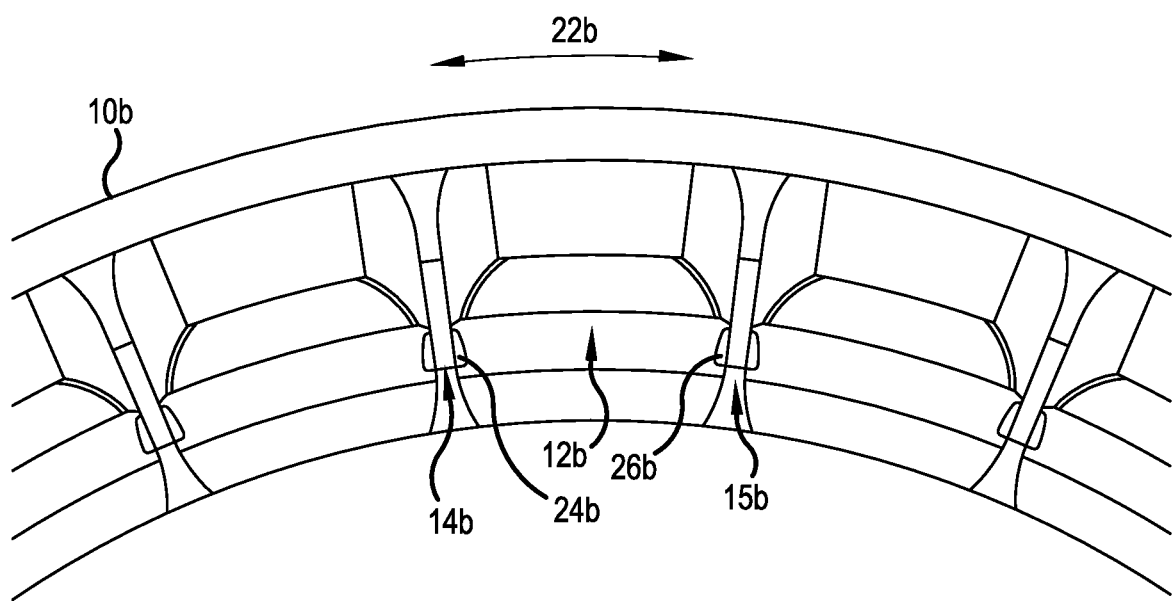
FIG. 7 is a perspective view of a part of the cage according to FIG. 6 along an axial direction.

FIGS. 6 and 7 show a further inventive exemplary embodiment of a cage. A pocket 12b of the cage is delimited, inter alia, by retaining elements 14b, 15b. The retaining element 14b includes a retaining lug 24b that extends in the circumferential direction to the retaining element 15b. Furthermore, the retaining lug 24b is disposed on a surface that is facing the retaining element 15b. In addition, the retaining lug 24b is disposed on a radially innermost-lying region of this surface. The retaining element 15b also includes a retaining lug 26b on its radially inner end, which retaining lug 26b extends in the circumferential direction toward the retaining element 14b. During installing of a rolling element 11b into the pocket 12b, the rolling element 11b is pressed against the retaining elements, and in particular the retaining lugs, until the retaining lugs deflect somewhat in the circumferential direction and the rolling element slides into the pocket. Thereafter the retaining elements move back into their initial position, whereby the rolling element in the pocket 12b is protected from falling out radially inward by the retaining lugs. In other words, the retaining lugs extend into the pocket 12b. The retaining lug 24b is disposed on a first extension 18b of a bridge of the cage. The retaining lug 26b is disposed on a further extension 20b of a further bridge of the cage. Both extensions extend radially inward from the respective bridge.

Figure 8:
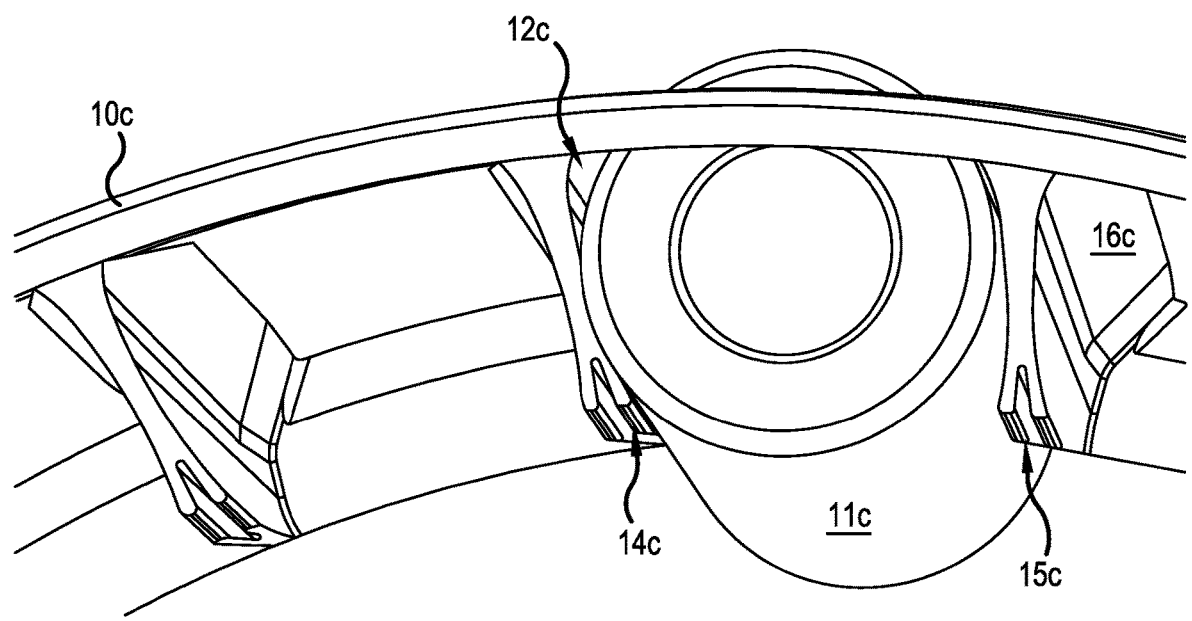
FIG. 8 is a perspective view of another cage that includes a pocket, which pocket contains a rolling element.

FIG. 8 shows a further inventive exemplary embodiment of a cage, wherein a roller 11c is inserted into a pocket 12c of the cage. A retaining element 14c and a retaining element 15c secure the roller 11c in an interference-fit manner from a falling-out radially inward from the pocket. The two retaining elements are constructed identically. Each of the two retaining elements includes a groove in its radially inner side, which groove extends essentially in the axial direction. A comparatively easy inserting of the rollers in the cage can thereby occur, since a yielding of the retaining elements in the circumferential direction is facilitated during the inserting of the rollers from radially inward.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing element cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Cage
11 Rolling element
12 Pocket
14 Retaining element
15 Retaining element
16 Bridge
17 Bridge
18 Extension
20 Extension
22 Circumferential direction
24 Retaining lug
26 Retaining lug
28 Retaining lug
30 Edge
32 Side
34 Rectangle
36 Side
38 Part
40 Axial direction
42 Lug
44 Lug
46 End side
48 Rolling surface
50 Bevel surface
52 Bevel surface
54 Recess

What is claimed is:

1. A rolling-element bearing cage comprising:
a plurality of pockets each configured to receive a rolling element, and
retaining means associated with each of the plurality of pockets for securing the rolling elements against falling out of the pockets in a radially inward direction while permitting the rolling elements to be inserted into the pockets in a radially outward direction,
wherein the plurality of pockets are configured such that the plurality of rolling elements cannot pass radially outward out of the pockets or radially inward into the pockets,
wherein the bearing cage comprises a first side ring and a second side ring axially spaced from the first side ring and a plurality of bridges connecting the first side ring to the second side ring, the pockets being defined by the first and second side rings and adjacent pairs of the plurality of bridges,
wherein the retaining means comprises a first lug extending axially into each of the pockets from the first side ring, and
wherein the second side ring has a plurality of portions located radially inward of the bridges and wherein the retaining means further comprises a plurality of second lugs extending axially from the plurality of portions.

2. The bearing cage according to claim 1, wherein a circumferential width of the pockets narrows in a radially outward direction.

3. The bearing cage according to claim 2, wherein the circumferential width of the pockets is narrowed by beveled walls radially outward of the second lugs.

4. An assembly comprising:
the bearing cage according to claim 3, and
the plurality of rolling elements in the pockets,
wherein a diameter of the rolling elements is greater than a circumferential distance between the beveled walls.

5. An assembly comprising:
the bearing cage according to claim 1; and
the plurality of rolling elements in the pockets.

6. A tapered rolling-element bearing including the assembly according to claim 5.

7. The assembly according to claim 5,
wherein each of the first lugs engages an opening in an axial end of one of the plurality of rolling elements, and
wherein a pair of the second lugs contact a rolling surface of one of the plurality of rolling elements.

* * * * *